UNITED STATES PATENT OFFICE.

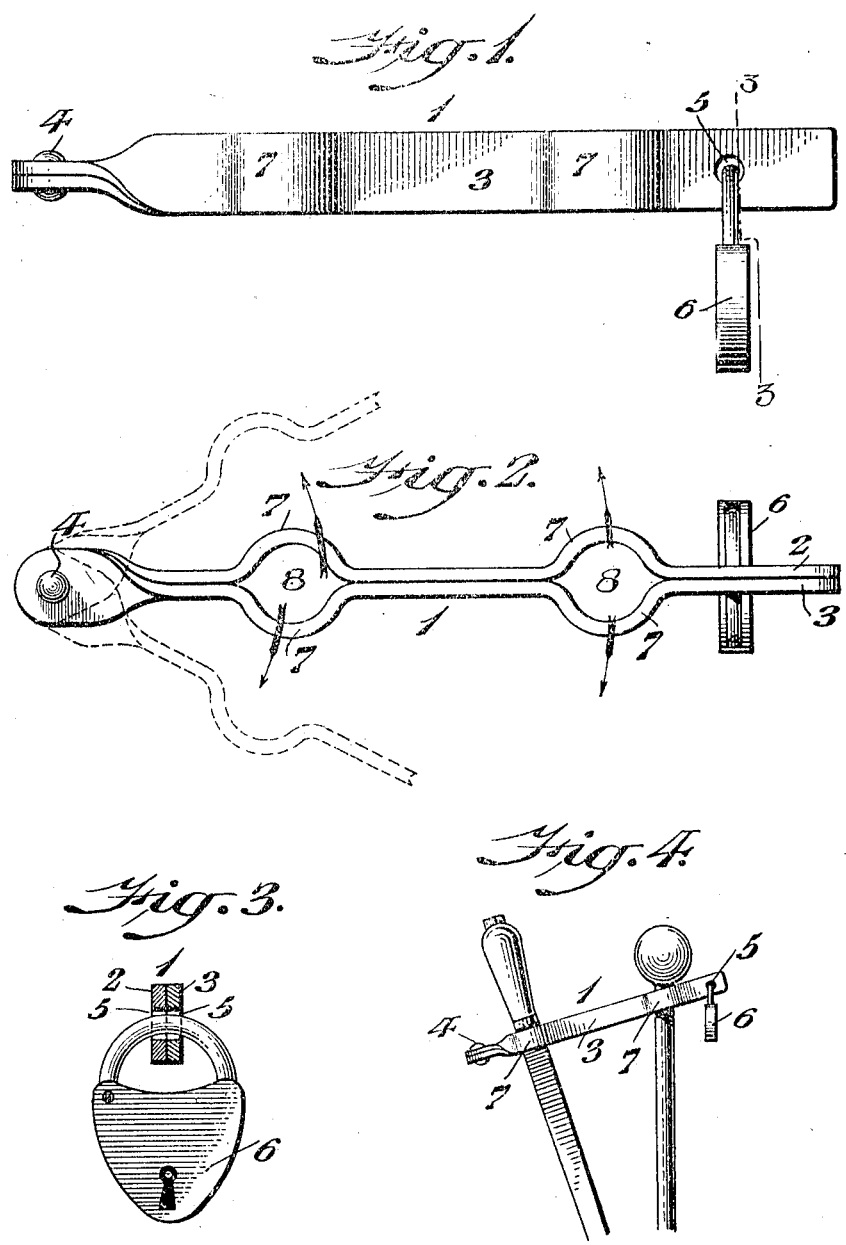

HENRY LANDMANN, OF PHILADELPHIA, PENNSYLVANIA.

AUTOMOBILE-LOCK.

1,274,427. Specification of Letters Patent. Patented Aug. 6, 1918.

Application filed April 11, 1917. Serial No. 161,115.

*To all whom it may concern:*

Be it known that I, HENRY LANDMANN, a citizen of the United States, residing in the city and county of Philadelphia, State of Pennsylvania, have invented a new and useful Automobile-Lock, of which the following is a specification.

My invention relates to a device for locking an automobile or other motor vehicle, and consists of a shackle or clamp of novel construction applicable to members of the gear shift and brake of such vehicle, so as to render the same immovable, whereby the vehicle cannot be run by an unauthorized person, or in other words, stolen.

The invention is satisfactorily illustrated in the accompanying drawing, but the important instrumentalities thereof may be varied, and so it is to be understood that the invention is not limited to the specific details shown and described.

Figure 1 represents a side elevation of a locking device for an automobile embodying my invention.

Fig. 2 represents a top plan view thereof.

Fig. 3 represents a section of a portion on line 3—3 Fig. 1.

Fig. 4 represents a diagrammatic view showing the device in position.

Similar numerals of reference indicate corresponding parts in the figures.

Referring to the drawings, 1 designates a shackle or clamp which is composed of the bars 2 and 3 which have at one end the perforated ears which receive the pivot 4, thus freely connecting said bars and admitting of the separation and closing of said bars as shown in dotted and full lines in Fig. 2. The other ends of said bars are free and form ears in which are the registering openings 5 which are adapted to receive the bolt of a lock, such as 6, which is of the order of a padlock or equivalent, whereby said ends of the bars may be held together in closed form.

In the bars in the direction of the length thereof are the outturned swells or loops 7 which may project from the respective bars in opposite directions, forming separate eyes 8, which as evident are integral with the bars, one eye being adapted to embrace the lever of the gear shift of the vehicle, and the other eye being adapted to embrace the lever of the emergency brake thereof, thus rendering said brake and gear shift immovable and inoperative whereby the auto or vehicle cannot be run, say by an unauthorized person, or one disposed to steal the vehicle until the said levers are unlocked, it being seen that the device is readily applicable to said levers in either of its reversed positions.

It will be seen that when the lock is removed from the bars, the latter may be separated, and then applied to the levers in question and closed against the same when the eyes 8 embrace said levers. Then the lock is applied to the ends of the bars so as to lock said ends and consequently the bars themselves, when the bars are prevented from opening and the eyes remained clasping said levers. As said levers are now controlled by the shackle, the former are rendered immovable and so the vehicle cannot be started or operated, the effect of which is evident. When the bars are unlocked they may be separated as shown dotted in Fig. 2, and so removed from the levers when the latter are free to be operated as usual.

Attention is directed to the fact that in manufacturing my device I take simply flat bars of metal and deflect one end of each of the same so as to form an ear which I perforate and it extends at a right angle to the length of the bar. In the ears in the openings thereof, when two bars are placed together as in Fig. 1, is inserted a pivot which when headed connects said ears and consequently the bars, whereby the latter may be opened and closed to the right and left, the ears in either case resting and being adapted to ride one on the other so that neither bar can drop from the other whether open or closed. When the bars are applied to the gear shift members, the half-swells close producing the complete eyes 8 which are open throughout from top to bottom. Then the free ends of the bars are locked, and the eyes take hold of said members in an inclined direction with a bite that prevents the device from dropping or slipping on said members below a desired position. Again, as the eyes 8 are open throughout from top to bottom as has been stated, the device may be reversibly applied in position and so requires no special consideration to fit said eyes on the gear shift members as they are the same at the top and bottom, this being due to the matched construction of the bars with their appurtenances, hence the device may be reversible.

In the manufacture of the device, I take flat metallic bars and form thereon the side swells 7, and therein the end openings 5 and deflect what will constitute the pivotal ends of the bars by twisting the metal at said pivotal ends at a right angle to the length of the bars so that said pivotal ends may lie flat one on the other, and when they are joined by the pivot 4, the bars are axially connected one on the other without the employment of knuckles or projecting members as heretofore practised.

Furthermore, when the device is removed from the gear shift members, the bars may be brought closely together forming a narrow and comparatively flat article that may be carried in the pocket of the chauffeur or driver, or placed on the floor of the vehicle, or hung thereon within convenient reach, occupying but little space. Finally the device will be found to be small, compact, light, and inexpensive in its nature, and admirably accomplishing the object for which it is intended.

When the bars are separated, as shown dotted in Fig. 2, the flattened portions still remain superimposed one on the other, and so the bars are sustained in the separated position, it being noticed also that when the bars are closed, the twisted portions which are near said flattened portions also engage and so the bars assisted by the latter are doubly sustained against sagging or dropping in said closed position.

Having thus described my invention what I claim as new and desire to secure by Letters Patent, is:—

A reversible device for locking movable members of an automobile or like vehicle formed of a pair of matched bars, each bar with its appurtenances being of integral construction, said bars having at opposite ends perforated ears, the ears at one end being connected freely by a pivotal member, and ears at the other end being adapted to be engaged by a lock-like member and intermediate of said opposite ears, laterally turned loops which are open on their inner sides and open throughout from top to bottom, the pivotal ears being bent at an angle to the surfaces of the bars which form the walls of said loops.

HENRY LANDMANN.

Witnesses:
 RUDOLPH MUNZER,
 JOHN F. STEIMLE, Jr.